Dec. 11, 1951  F. B. WALDRON ET AL  2,577,937
METHODS OF AND APPARATUS FOR GRINDING FLAT GLASS
ON BOTH FACES SIMULTANEOUSLY
Filed Aug. 26, 1949  2 SHEETS—SHEET 1
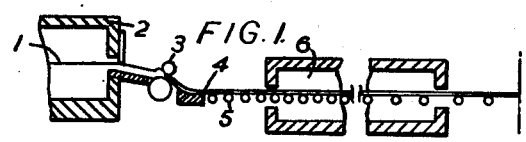
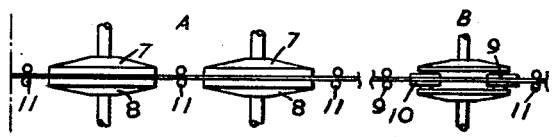
FIG.3.
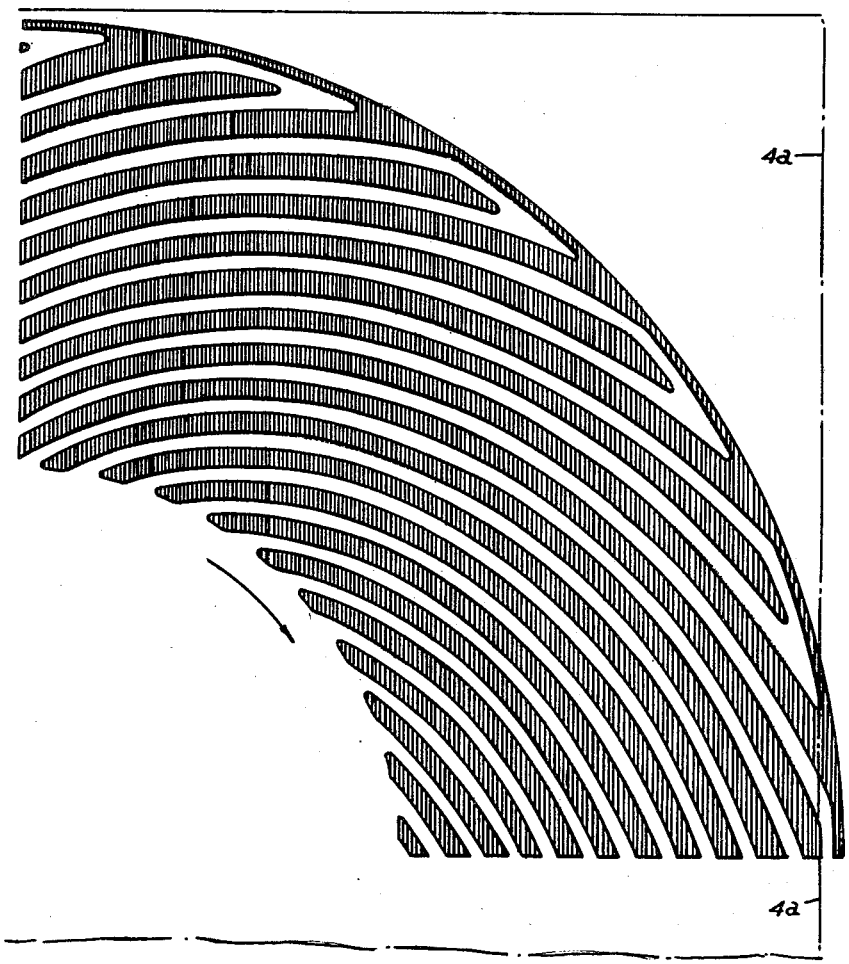
Frederic Barnes Waldron
James Harris Griffin  Inventors,
By
Morrison, Kennedy & Campbell
Attorneys,

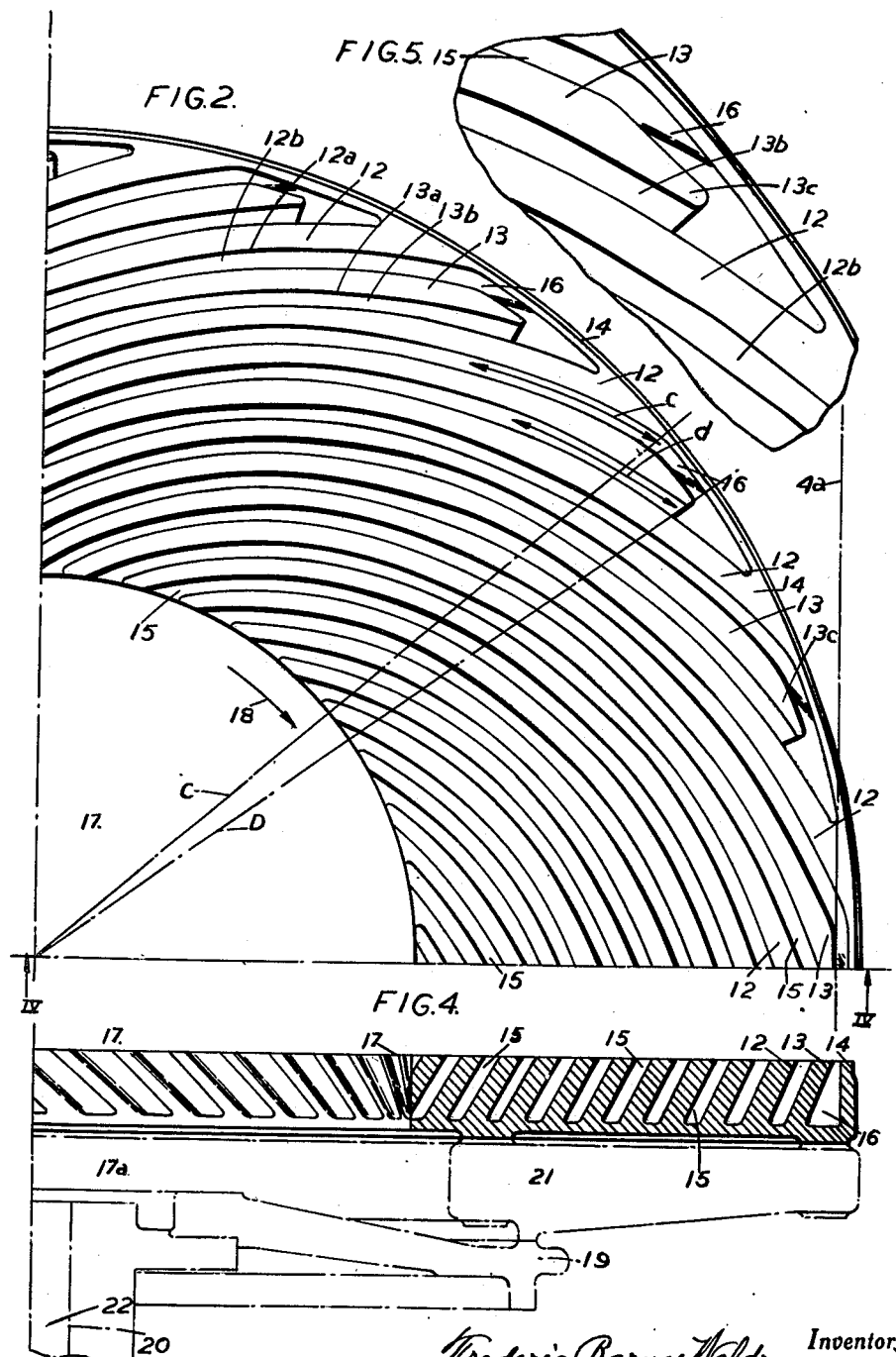

UNITED STATES PATENT OFFICE 2,577,937

METHOD OF AND APPARATUS FOR GRINDING FLAT GLASS ON BOTH FACES SIMULTANEOUSLY

Frederic Barnes Waldron, Eccleston Park, Prescot, and James Harris Griffin, St. Helens, England, assignors to Pilkington Brothers Limited, Liverpool, England, a corporation of Great Britain Application August 26, 1949, Serial No. 112,472

9 Claims. (Cl. 51—112)

This invention relates to methods of and apparatus for grinding flat glass on both faces simultaneously, and especially to methods of and apparatus for continuously grinding the underface of horizontally disposed flat glass in ribbon form simultaneously with the grinding of the upper face.

In grinding plate glass in horizontal ribbon form, it is usual to grind the ribbon of glass which is formed from molten glass in a tank on both faces simultaneously as it travels forward from the lehr, by employing an aligned series of opposed pairs of grinder discs, each rotating about a vertical axis, between which discs the ribbon moves whilst being supported in the grinding bays by the bottom grinder discs.

In such form of apparatus, each grinder disc commonly comprises an annular grinding surface which surrounds a central aperature in the disc and is in turn surrounded by a continuous rim, and the grinding surface is constituted by the horizontal surfaces of several concentric rings of rectangular nogs, which are separated, as islands, from one another and from the coplanar continuous rim, by approximately concentric channels intersected by straight channels extending outwardly from the central aperture to the rim. Each of the intersecting straight channels is inclined to the radius of the grinder disc drawn from the point at which it starts from the central aperature.

Abrasive fluid, usually a mixture of sand and water, is fed under a hydrostatic head to the central aperature of each grinder disc, from which it floods through the channels and across the operative surfaces of the nogs as the disc rotates, reaching the glass, where it is caught between a face of the glass and the operative surfaces of the respective nogs, finding outlet between the edges of the glass ribbon and the rim of the grinder disc.

In the case of each bottom disc the abrasive fluid is fed upwardly through the respective tool shaft into the cavity formed within the usual adaptor plate of the respective tool and the grinder disc, and the hydrostatic head on the abrasive should be such as to maintain full the cavity and the channels whilst the fluid spreads to the rim as the disc rotates, so as to assure the maintenance of a requisite film of the abrasive fluid between the operative surfaces of the nogs and the undersurface of the glass against the pressure exerted by the co-operating upper disc on the glass.

Experience has shown that in the case of grinder discs operating on the underface of the glass, the abrasive travels mostly on the bottom of the channels, and does not reach the glass, except at the outer ends of the channels, where it becomes heaped up by centrifugal force. In consequence the outer nogs effect most of the grinding, so that irregular grinding results and the discs wear unevenly, and must be removed in order that the grinding surfaces may be trued, and to substitute a plane grinding disc. This changing over operation occupies about one and a half hours.

Unless the surfaces of the bottom grinders are flat it is impossible to grind the glass flat.

Since the grinding apparatus comprises ten or more bottom grinder discs, stoppages for replacing deformed discs by plane discs cause a serious loss of operational time and moreover each truing operation reduces the life of the grinder affected.

The resistance to outward flow of abrasive from each grinder disc of the known form is almost entirely at the rim of the grinder, and in order to obtain a requisite mass movement of abrasive the arrangement is such that the ribbon of glass when of normal width does not quite cover the usual continuous circumferential channel which separates the outer series of nogs from the rims of the discs and thereby a balance between outflow and feed of abrasive fluid is achieved, but if the superficial area of the circumferential channel exposed is increased by the ribbon width decreasing or by lateral movement of the ribbon, as sometimes occurs in practice, the resistance to mass flow, occurring at the rim, is reduced and engenders an excessive, wasteful, flow of fluid from the discs.

Main objects of the present invention are to improve the quality of ground glass produced from grinding apparatus of the kind described and to make more economical such production; to devise an improved form of bottom grinder disc which will tend to remain flat in use and thereby maintain an essential condition for continually producing ground flat glass; and whilst minimising wasteful flow, to provide an adequate supply of abrasive fluid at every point of the grinding surface.

The attainment of the last mentioned object is essential for attaining even wear of the grinder disc and thereby the periods of uninterrupted production may be considerably prolonged.

The present invention comprises a novel construction of grinding disc intended for use in grinding the underface of horizontally disposed flat glass simultaneously with the grinding of the upper face as the glass is advanced across the grinding surface of the grinding disc in parallelism therewith comprising a grinding surface of which the effective peripheral radius is such as to overlap at least one edge of the glass, said grinding surface surrounding a central aperture in the disc through which abrasive fluid is supplied to the grinding surface, characterised in that the said grinding surface comprises the upper surfaces of one series of continuous bars spaced apart on the disc and disposed thereon in an annular form concentric with the central aperture and forming between them distributing channels for abrasive fluid leading from the central aperture, means adapted to regulate the outflow from said distributing channels, each bar being continuously curved in the intended direction of rotation of the disc, and increasing in circumferential width from its inner end outwardly, the acute angle which the leading edge of each curved bar makes with the radius at any point increasing continuously from the inner to the outer end of the respective bar, and each bar having its leading face inclined to its upper surface at an obtuse angle which diminishes continuously from the inner to the outer end of the bar, the variation of this inclination being so related to the variation of the acute angle between the leading edge and the radius that a due proportion of the abrasive is lifted from the distributing channels at every point along each bar and is engaged by the operative surface of the bar, while the remainder is driven along the channel.

The upper surface of each of the grinding bars presents to the glass an uninterrupted area or path along which the pressure of the grinder disc is equally applied across an annular zone of the glass which corresponds to the inner and outer boundaries of the annular grinding surface.

By so constructing the grinding surface and by continually providing an adequate amount of abrasive fluid thereover such even wear of the bars is obtained that very prolonged periods of production of flat ground glass can be obtained without interruptions for changing over grinding discs.

The means adapted to regulate the outflow of abrasive from the distributing channels, which flow occurs as the end of a channel is exposed at an edge of the glass, may be constituted by plugs inserted in the ends of the channels, such plugs having a surface formed of a material which is soft relatively to the metal of the disc so as not to increase the area of grinding surface.

Preferably, however, the grinding disc constructed according to the present invention comprises a rim, which may be an integral part of the disc and which is co-planar with the surfaces of said grinding bars and in that some of the bars are longer than the others and are merged with the rim thereby defining a succession of circumferential channels in contiguity with the rim, each of which merges with two distributing channels, and which circumferential channels are progressively exposed successively beyond an edge of the glass as the disc rotates, the outer ends of the bars making an angle of from 60 to 80 degrees with the radius of the disc passing through said outer ends.

The circumferential channels so formed are short accordingly the superficial area of fluid near the periphery exposed beyond the edge of the ribbon is at all times considerably smaller than it would be if there was a continuous peripheral channel.

When the rim is attached it may be constructed with a surface comprised wholly or in part of material other than metal, which material is softer than iron to avoid excess metal at the marginal area of the disc.

The rim, in co-operation with the configuration of the bars, suitably constrains the flow of abrasive and water along the distributing channels, the rim acting as a weir regulating the rate of outflow and the configuration assures the lifting of the abrasive in adequate quantity along the whole effective grinding surfaces of the bars.

Instead of providing a rim to the disc, the outflow from the channels may be regulated by connecting the extremities of contiguous bars where they are all of the same length, or by connecting the adjacent longer bars where both long and shorter bars are employed. Such connecting members are preferably formed of material which is relatively soft as compared with the metal of the grinder disc.

Grinding discs employed according to the present invention may be dimensioned so as to overlap one edge only of the glass. In preferred constructions, however, the grinding disc is so constructed that the ends of the distributing channels are alternately exposed first at one edge and then at the other edge of the glass, and in the latter form of construction the grinding disc constructed according to the present invention preferably comprises a continuous rim, the inner diameter of which is greater than the width of the ribbon, characterised by the grinding surface being comprised by the upper surfaces of one annular series of bars spaced apart on the disc to form distributing channels for the abrasive fluid leading from the central aperture to the rim, each bar being curved in the intended direction of rotation of the disc, the outer extremities of some of the bars merging with the rim, but not more than two in succession of the remaining bars being spaced from the rim thereby defining circumferential channels which merge with distributing channels, the shorter bars having a length to extend to each edge of the glass as the disc rotates, every bar progressively increasing in circumferential width from its inner end outwardly, the leading edge of each curved bar being at any point inclined at an acute angle to the radius at that point, which acute angle increases continuously from the inner to the outer end of the bar, the leading edge at the outer part being inclined to the radius at an angle of from 60 to 80 degrees, and each bar having a leading face inclined at an obtuse angle to its upper surface which angle diminishes continuously from the inner to the outer end of the bar, the variation of this inclination and their variations being so related to the variation of the acute angle between the leading edge and the radius that a due proportion of the abrasive is lifted from the distributing channels at every point along each bar and is engaged by the operative surface of said bars, while the remainder is driven along the channel.

Apparatus for simultaneously grinding both faces of horizontally disposed flat glass constructed according to the present invention comprises a series of co-axial pairs of grinding discs, each pair being rotated about a common vertical axis, each disc including a grinding surface formed around a central aperture in the disc through which abrasive fluid is fed to the grinding surface of the disc, means for advancing the glass between the opposed pairs of discs, the glass being supported by the grinding surface of the bottom discs of each pair, the effective peripheral radius of the grinding surface of each disc being such as to overlap at least one edge of the glass being ground and the grinding surface of each bottom disc comprising the upper surface of one series of curved bars constructed as already described.

In such form of apparatus the grinding surface of each upper disc of each said pair is preferably constituted by the co-planar surfaces of one annular series of bars spaced apart on the disc in an annular form concentric with the central aperture and forming between them distributing channels for abrasive fluid leading from the central aperture, each being continuously curved in the intended direction of the rotation of the disc and increasing in circumferential width from its inner end outwardly, the acute angle which the leading edge of each curved bar makes to the radius at any point increasing continuously from the inner to the outer end of the respective bar.

In operating apparatus constructed according to the present invention a novel method of grinding flat glass on both faces simultaneously is achieved, such method of grinding being constituted by a rubbing action under pressure exerted vertically on the surfaces of the ribbon and characterised in that the underface is ground by pressure exerted all along each of an annular series of continuous curved paths which are continuously moved round the centre of the annulus and extend outwardly to substantially the edge of the ribbon, each path being forwardly directed, increasingly with increasing radius, and increasing in circumferential width from its inner to its outer end approximately in proportion to the radius and in that the abrasive fluid is adequately distributed along said paths whilst flowing outwardly under the influence of centrifugal force generated as the grinding forces are moved around the annulus, by constraining the flow of the fluid between said paths so as to develop a lifting force acting against the action of gravity to deliver abrasive on to said paths along the full length thereof.

The forces for lifting the abrasive fluid and for driving it along distributing channels formed between the curved paths are in part derived from the hydrostatic head, but are mainly derived from the radially acting centrifugal force; the proportion of this force implemented to generate the lift applied to the abrasive depends on the inclination of the leading edge of the grinding bar to the radius and on the inclination of the leading face of the grinding bar to its operative surface, while the complementary proportion tending to drive the abrasive along the channel depends on the inclination of the edge of the grinding bar to the radius.

The centrifugal force increases proportionately to the radius, and experiments have shown that an adequate distribution of the abrasive can be secured by varying the proportions of the force tending to lift the abrasive all along each bar from the inner to the outer end and of the force tending to drive it along the channel.

Further, it has been found that, to secure adequate distribution there must be a predetermined relation between the variations of the two aforesaid inclinations in order to ensure the desired variations in the above mentioned proportions of the force.

The amounts of the above mentioned inclinations and the relation between the amounts of their variation with the radius depend on the speed and size of the grinder disc.

Thus, abrasive material all of predetermined grading is supplied all over the grinding surface of a particular bottom grinder disc.

By such method of grinding the same amount of glass is removed from the underface of the glass at all points along each said path so that the ground face is flat and if the grinding disc operates across the full width of the ribbon, edge trimming is avoided.

Apparatus for manufacturing ground flat glass from molten glass in one continuous operation in accordance with the present invention comprises in combination, means for melting batch material in the manufacture of glass, means for producing a plastic ribbon of glass from the molten glass so produced, means for supporting the plastic ribbon in a horizontal plane, means for cooling the ribbon, an alined series of co-axial pairs of top and bottom grinding tools, the axes of which are disposed as normals to the glass, means for advancing the cooled ribbon between the grinding tools, each tool being provided with a centrally apertured grinding disc, the ribbon of cooled glass passing between the pairs of opposed discs and being supported by the bottom discs of the pairs, each top tool having a grinder disc comprising curved grinder bars of the same continuous form as that described herein for a bottom grinder disc, but since the abrasive is supplied to the upper face of the glass under gravity, the leading faces of the upper disc bars may be perpendicular to the operative surface of the disc. Preferably however the top disc is constituted exactly the same as the bottom disc according to the invention.

In order that the invention may be more clearly understood reference will now be made to the accompanying drawings which show by way of example a preferred embodiment thereof.

In the drawings:

Fig. 1 is a diagrammatic elevation showing glass grinding apparatus of the kind to which the present invention relates and embodying grinder discs constructed according to the present invention;

Fig. 2 shows in plan view a quadrant part of one of the bottom grinder discs;

Fig. 3 illustrates a quadrant part of the annular series of forwardly directed outwardly curved paths along which the grinding pressure is applied according to the invention;

Fig. 4 is a sectional elevation taken on the line IV—IV of Fig. 2, and indicating the known manner of mounting the disc on a tool; and Fig. 5 is a fragmentary detail view to a larger scale showing more clearly the construction of the grinder bars near to the periphery of the rim of a bottom grinder disc.

In the drawings like references designate the same or similar parts.

Referring first to Fig. 1. The means for melting batch material in the manufacture of glass 1 consists of a tank 2 from which the molten glass flows to ribbon forming means consisting of rolling apparatus 3 from which the ribbon 4 in plastic state moves forwardly, means for supporting the plastic ribbon in a horizontal plane consisting of a roller bed 5 on which the ribbon passes to ribbon cooling means in the form of a lehr 6. After passing through the lehr the ribbon passes between a series of co-axial grinders usually about ten in number, but only two of which are indicated at A.

The grinders comprise top and bottom tools which include respectively grinder discs 7 and 8, the glass being supported in its passage from the lehr by the bottom grinders whilst moving in parallelism therewith.

The series of co-axial grinder discs employed in grinding apparatus of the kind refered to effect a progressive grinding action on the glass and those nearest to the lehr are supplied with a relatively coarse sand and water mixture, whilst those in the final stages receive a very fine sand and water mixture, the intermediate disc pairs being supplied with abrasive fluid in which the sand is progressively finer from the coarse grinding-end to the smoothing end of the apparatus.

The ground glass may be merchandised by cutting up the ribbon leaving the grinders but the ground ribbon may pass on to polishing tools of which there are usually at least as many as there are grinders. Each polishing tool, one only being indicated as B, comprises top and bottom frames which carry rotatable polishing tools indicated at 9 and 10 respectively.

The ribbon is driven forwardly and thus advanced between the grinders and polishers by pairs of rollers indicated at 11.

As clearly indicated in Fig. 2 each bottom grinder disc comprises an annular grinding surface including the upper surfaces of one annular series of curved bars constituted by forty grinding bars indicated at 12, and 13 of spiral form.

Such arrangement has proved to be satisfactory where the annular grinding surface has a middle radius of about 90 cms. and is designed for a speed of about 60 revolutions per minute.

Each of the grinding bars progressively increases in a circumferential width from 5 cms. at the inner radius to about 10 cms. at the outer radius, the increase in width being approximately proportional to the radius so that the rate of wear of the narrower width is maintained substantially equal to the rate of wear of the bars near the rim.

The inclined leading edge of each grinding bar is indicated at 12a and 13a respectively and the acute angle which this leading edge makes with the radius increases from about 55° at its inner radius to about 70° at its outer radius. In grinding discs generally, according to the invention, adapted for commercial conditions, the said acute angle of the leading edge at its outer part is preferably from 10 to 20 degrees greater than at about half the maximum radius, the inclination at about half maximum radius being from 45 to 65 degrees.

The inclination of the leading face 12b, 13b, at the outer part is preferably from 10 to 24 degrees less than at about half maximum radius, the inclination at half maximum radius being from 110 to 130 degrees and that at the outer part from 93 to 113 degrees.

By "outer part of each leading edge" is meant a length of leading edge extending inwardly from the outer end for about one foot and as indicated at c and d on the longer and shorter bars respectively in Fig. 2, and the respective radii being indicated by the references C and D.

The configuration adopted for the bars affords sufficient resistance to flow along the distributing channels to maintain the component of centrifugal force along each of the channels sufficiently small to prevent excessive flow of abrasive fluid, under normal operation conditions.

The width of each grinder bar need not be further specified, since it is known from grinding practice with the customary concentric rings of "Island" nogs of rectangular from arranged within the annulus between the rim and the central aperture, that an unbroken grinding surface should not exceed a few inches in circumferential width.

The bars 12 merge with a narrow rim 14, i. e. as narrow as possible having regard to mechanical strength, whilst the intermediate bars 13 are, in the construction illustrated, separated from the rim by a distance which is substantially equal to the width of channels 15 which separate the bars, and constitute distributing channels for the abrasive fluid. The surface of the rim is in the plane of the grinding surface to assure the distributing channels being filled, and the inner diameter of the rim is greater than the width of the ribbon.

The channels 15 are arranged in connected pairs, the connections being constituted by a peripheral series of short circumferential channels 16 in contiguity with the rim and defined by the longer bars 12, which channels as clearly shown in Figs. 2 and 5 separate the bars 13 from the rim, extend between two bars 12 and merge with two of the channels 15.

Accordingly in the construction illustrated between each two bars 12 which merge with the rim 14 is a channel which viewed in plan is of U-shaped and surrounds an intermediate bar 13, the U-channel having two equal limbs each constituted by a distributing channel 15 and a closed end constituted by a short circumferential channel 16.

In grinder discs so constructed in accordance with the invention the circumferential channel is discontinuous, thereby considerably restricting increased outflow when the ribbon is narrower than the normal width, or has moved laterally.

All the bars 12, 13, are arranged transversely of the annulus between the usual central aperture 17 and the rim 14, and run outwardly from the ceneral aperture in a constantly forward direction considering the intended direction of rotation of the disc indicated by the arrow 18; every bar being of such length that when disposed at right angles to the direction of travel of the ribbon it extends beyond the ribbon edge which is indicated at 4a in Fig. 2.

The upper surface of each of the bars 12 and 13 presents to the glass an uninterrupted spiral path along which the pressure of the grinder disc is equally applied across the annular zone corresponding to the annular grinding surface between the central aperture and rim of the grinder disc as illustrated in Fig. 3; the abrasive is fed to the upper surface of the bars from the channels 15 and the rotation of the disc causes a concomitant continuous abrasive movement.

At the smoothing end of the grinding apparatus the bars may be of about the same width as the distributing channel, as shown in the drawings, but at the coarse grinding end the bars may be much wider, for example twice as wide as the distributing channels.

It will be observed that in employing bottom grinder discs having a grinding surface of a diameter which is at least as great as the width of the ribbon to be ground, the ends of the distributing channels are covered by the ribbon during the greater portion of each revolution of the disc and only intermittently uncovered when the said ends pass beyond the edges of the ribbon.

The glass in ribbon form accordingly prevents free flow along any channel except when the outer end of the latter is beyond the glass edge, and in this time (say one-tenth of a second) the outer part of the channel is emptied of fluid and is filled again by flow along the channel when the end is again covered by the ribbon.

The whole of the abrasive in each channel is thus caused to move intermittently and the sand is kept adequately in suspension without excessive loss of abrasive even though the average motion is not rapid.

By forming the outer parts of the distributing channels in accordance with the invention the component of centrifugal force tending to empty the channel of fluid is diminished to less than one half of the total force.

As diagrammatically illustrated in Fig. 4 the grinder disc is mounted in known manner on the flange 19 of a tool 20 by the intermediary of a casing 21, usually referred to as an "adaptor plate," which with the tool and disc forms a central cavity 17a to which abrasive is fed upwardly through the shaft 22 of the tool, the mouth of the cavity 17a being constituted by the central aperture 17 of the disc.

In the construction of apparatus according to the invention each top grinder associated with the bottom grinders herein described may have grinding bars of the same continuous curved form and configuration as that described for a bottom grinder disc, and the same number of bars are preferably employed, but since the abrasive is supplied to the upper face of the glass under gravity, the leading faces of the upper disc bars may be perpendicular to the operative surface of the disc.

From the foregoing it will be seen that the invention also includes a method of grinding a ribbon of glass on both faces simultaneously while the ribbon is being continuously advanced in a horizontal plane and by applying equal pressure forces spaced around an annular zone extending across the ribbon perpendicularly to both glass faces with continuous abrasive movement round each zone, characterised in that the grinding forces are applied to both faces of the glass along equally spaced curved paths each of which extends without interruption across the annular zone and outwardly and forwardly in the direction of movement of the paths round the zone, each said path having circumferential width which increases from the inside to the outside of the zone in proportion to the radius, and continuously maintaining an adequate supply of abrasive to all said paths.

By the present invention no part of the grinding surface of the bottom disc fails to receive an adequate supply of abrasive and the bars wear evenly so as to remain flat. Consequently, and since an adequate supply of abrasive to all parts of the operative surface of the upper disc is ensured by gravity, the invention permits uniform grinding and smoothing to be obtained on both surfaces of the glass simultaneously over relatively long periods of production uninterrupted by stoppages for changing unevenly worn discs for plane discs. The present invention also comprises the flat plate glass ground simultaneously on both faces as herein described.

We claim:
1. A bottom grinding disc for use in grinding the underface of horizontally disposed flat glass in ribbon form simultaneously with the grinding of the upper face as the glass is advanced across the grinding surface of the grinding disc in parallelism therewith comprising a grinding surface of which the effective peripheral radius is such as to overlap at least one edge of the glass, said grinding surface surrounding a central aperture in the disc through which abrasive fluid is supplied to the grinding surface, characterised in that the said grinding surface comprises the upper surfaces of a series of continuous bars spaced apart on the disc and disposed thereon in an annular form concentric with the central aperture and forming between them distributing channels for abrasive fluid leading from the central aperture, means being provided to regulate the outflow from said distributing channels, each bar being continuously curved in the intended direction of rotation of the disc, and increasing in circumferential width from its inner end outwardly the acute angle which the leading edge of each curved bar makes with the radius at any point increasing continuously from the inner to the outer end of the bar, and each bar having its leading face inclined to its upper surface at an obtuse angle which diminishes continuously from the inner to the outer end of the bar, the variation of this inclination being so related to the variation of the acute angle between the leading edge and the radius that a due proportion of the abrasive is lifted from the distributing channels at every point along each bar and is engaged by the operative surface of the bar, while the remainder is driven along the channel.

2. A grinding disc according to claim 1 further characterised in that the disc comprises a rim which is coplanar with the surface of said grinding bars and in that some of the bars are longer than the others and are merged with the rim thereby defining a succession of circumferential channels in contiguity with the rim, each of which merges with two distributing channels, and which circumferential channels are progressively exposed successively beyond an edge of the glass as the disc rotates, the outer ends of the bars making an angle of from 60 to 80 degrees with the radius of the disc passing through said outer ends.

3. A grinding disc, for use in grinding the under face of flat glass in ribbon form simultaneously with the grinding of the upper face as the glass is advanced in a horizontal plane, including a grinding surface between a central aperture in the disc, to which aperture abrasive fluid is fed, and a continuous rim, the inner diameter of which is greater than the width of the ribbon, characterised by the grinding surface being comprised by the upper surfaces of one annular series of bars spaced apart on the disc to form distributing channels for the abrasive fluid leading from the central aperture to the rim, each bar being curved in the intended direction of rotation of the disc, the outer extremities of some of the bars merging with the rim, but not more than two in succession of the remaining bars being spaced from the rim thereby defining circumferential channels which merge with distributing channels, the shorter bars having a length to extend to each edge of the glass as the disc rotates, every bar progressively increasing in circumferential width from its inner end outwardly, the leading edge of each curved bar being at any point inclined at an acute angle to the radius at that point, which acute angle increases continuously from the inner to the outer end of the bar, the leading edge at the outer part being inclined to the radius at an angle of from 60 to 80 degrees, and each bar having a leading face inclined at an obtuse angle to its upper surface which angle diminishes continuously from the inner to the outer end of the bar, the variation of this inclination being so related to the variation of the acute angle between the leading edge and the radius that a due proportion of the abrasive is lifted from the distributing channels at every point along each bar and is engaged by the operative surface of said bars, while the remainder is driven along the channel.

4. Apparatus for simultaneously grinding both faces of horizontally disposed flat glass including a series of co-axial pairs of grinder discs, each pair being rotated about a common vertical axis, each disc including a grinding surface formed around a central aperture in the disc through which abrasive fluid is fed to the grinding surface of the disc, means for advancing the glass between the opposed pairs of discs, the glass being supported by the grinding surface of the bottom discs of each pair, the effective radius of the grinding surface of each disc being such as to overlap at least one edge of the glass being ground, the grinding surface of each bottom disc of a pair comprising the upper surface of one series of continuous bars spaced apart on the disc in an annular form concentric with the central aperture and forming between them distributing channels for abrasive fluid leading from the respective central aperture, means adapted to regulate the outflow from said distributing channels, each bar being continuously curved in the intended direction of rotation of the disc, and increasing in circumferential width from its inner end outwardly, the acute angle which the leading edge of each curved bar makes with the radius at any point increasing continuously from the inner to the outer end of the respective bar, and each bar having its leading face inclined to its upper surface at an obtuse angle which diminishes continuously from the inner to the outer end of the bar, the variation of this inclination being so related to the variation of the acute angle between the leading edge and the radius that a due proportion of the abrasive is lifted from the distributing channels at every point along each bar and is engaged by the operative surface of the bar, while the remainder is driven along the channel.

5. Apparatus for grinding flat glass according to claim 4, wherein each bottom grinding disc of each said pair of discs comprises a rim which is coplanar with the upper surfaces of said grinding bars and in that some of the bars are longer than the others and are merged with the rim thereby defining a succession of circumferential channels in contiguity with the rim, each of which merges with two distributing channels and which circumferential channels are progressively exposed beyond an edge of the glass as the disc rotates, the outer ends of the bars making an angle of from 60 to 80 degrees with the radius of the disc passing through said outer ends.

6. Apparatus for grinding flat glass according to claim 5 characterised in that the grinding surface of each disc of each said pair of discs comprises the co-planar surfaces of one annular series of bars spaced apart on the disc in an annular form concentric with the central aperture and forming between them distributing channels for abrasive fluid leading from the central aperture, each being continuously curved in the intended direction of the rotation of the disc and increasing in circumferential width from its inner end outwardly, the acute angle which the leading edge of each curved bar makes to the radius at any point increasing continuously from the inner to the outer end of the respective bar.

7. Method of grinding flat glass on both faces simultaneously as it is continuously moved forwardly in a horizontal plane, by a rubbing action under pressure exerted vertically on the surfaces of the ribbon, characterised in that the underface is ground by pressure exerted all along each of an annular series of continuous curved paths which are continuously moved round the centre of the annulus and extend outwardly to substantially the edge of the ribbon, each path being forwardly directed, increasingly with increasing radius, and increasing in circumferential width from its inner to its outer end approximately in proportion to the radius and in that the abrasive fluid is adequately distributed along said paths whilst flowing outwardly under the influence of centrifugal force generated as the grinding forces are moved around the annulus, by constraining the flow of the fluid between said paths so as to develop a lifting force acting against the action of gravity to deliver abrasive on to said paths along the full length thereof.

8. Apparatus for manufacturing ground flat glass comprising means for melting batch material in the manufacture of glass, means for producing a plastic ribbon of glass from the molten glass so produced, means for supporting the plastic ribbon in a horizontal plane, means for cooling the ribbon, an aligned series of co-axial pairs of top and bottom grinding tools, the axes of which are normal to the ribbon, means for advancing the cooled ribbon between the grinding tools, each tool being provided with a centrally apertured grinding disc, the ribbon of glass passing between the pairs of opposed discs and being supported by the bottom discs of the pairs, each grinding disc having an annular grinding surface the effective diameter of which is greater than the width of the ribbon being treated and means for supplying abrasive fluid through the central aperture of each disc to its grinding surface, the annular grinding surface of each grinding disc comprising the coplanar surfaces of curved bars and of a rim to the disc, the curved bars being spaced apart on the disc in an annular form concentric with the central aperture, and forming between them distributing channels for abrasive fluid leading from the central aperture, each bar being continuously curved in the intended direction of rotation of the disc and increasing in circumferential width from its inner end outwardly, the acute angle which the leading edge of each curved bar makes with the radius at any point increasing continuously from the inner to the outer end of the respective bar, some of the bars on each bottom grinder disc being longer than the other bars on the respective disc and merging with its rim thereby defining a succession of circumferential channels in contiguity with the rim, each of which merges with two distributing channels, which circumferential channels are progressively exposed successively beyond each edge of the glass as the discs rotate, the outer ends of the bars on the bottom grinding discs making an angle of from 60 to 80 degrees with the radius of the disc passing through said outer ends, and each bar on the bottom discs having a leading face inclined at an obtuse angle to its upper surface which angle diminishes continuously from the inner to the outer end of the bar, the variation of this inclination being so related to the variation of the acute angle between the leading edge and the radius that a due proportion of the abrasive is lifted from the distributing channels at every point along each bar and is engaged by the operative surface of said bars, while the remainder is driven along the channel.

9. Apparatus for grinding flat glass according to claim 4, characterized in that the grinding surface of each disc of each said pair of discs comprises the co-planar surfaces of one annular series of bars spaced apart on the disc in an annular form concentric with the central aperture and forming between them distributing channels for abrasive fluid leading from the central aperture, each being continuously curved in the intended direction of the rotation of the disc and increasing in circumferential width from its inner end outwardly, the acute angle which the leading edge of each curved bar makes to the radius at any point increasing continuously from the inner to the outer end of the respective bar.

FREDERIC BARNES WALDRON.
JAMES HARRIS GRIFFIN.

REFERENCES CITED

The following references are of record in the file of this patent:

UNITED STATES PATENTS

| Number | Name | Date |
|---|---|---|
| 2,270,362 | Waldron et al. | Jan. 20, 1942 |